United States Patent [19]
Hanton

[11] 3,738,020
[45] June 12, 1973

[54] PROCESS FOR EXPANDING POLYSTYRENE
[75] Inventor: Daniel Hanton, La Neuville Roy (Oise), France
[73] Assignee: Compagnie de Saint-Gobain, Neuilly-sur-Seine, France
[22] Filed: Sept. 8, 1970
[21] Appl. No.: 69,906

Related U.S. Application Data
[62] Division of Ser. No. 542,363, April 13, 1966, Pat. No. 3,598,769.

[30] Foreign Application Priority Data
Apr. 14, 1965  France .............................. 6513184

[52] U.S. Cl. .......................... 34/217, 34/65, 34/236
[51] Int. Cl. ........................................... F26b 19/00
[58] Field of Search .................... 34/36, 37, 65, 66, 34/216, 217, 236; 252/378, 378 P; 263/21 B; 260/2.5 B; 106/41, 74, 75, 122; 264/41, 51, 53

[56]  References Cited
UNITED STATES PATENTS
| 294,510 | 3/1884 | Sargent et al. ..................... 34/217 X |
| 2,884,386 | 4/1959 | McMillan et al. ................ 260/2.5 B |
| 3,386,716 | 6/1968 | Doyle et al. ..................... 264/53 UX |

FOREIGN PATENTS OR APPLICATIONS
1,180,049  12/1958  France ................................. 264/53

Primary Examiner—Kenneth W. Sprague
Assistant Examiner—James C. Yeung
Attorney—Dale A. Bauer, John L. Seymour and Bauer and Seymour

[57]  ABSTRACT

The present invention relates to expanded or blown polystyrene adapted for making articles such as blocks, slabs and shaped pieces and particularly to an improved process for expanding the granules of polystyrene preparatory to the manufacture of articles therefrom.

7 Claims, 1 Drawing Figure

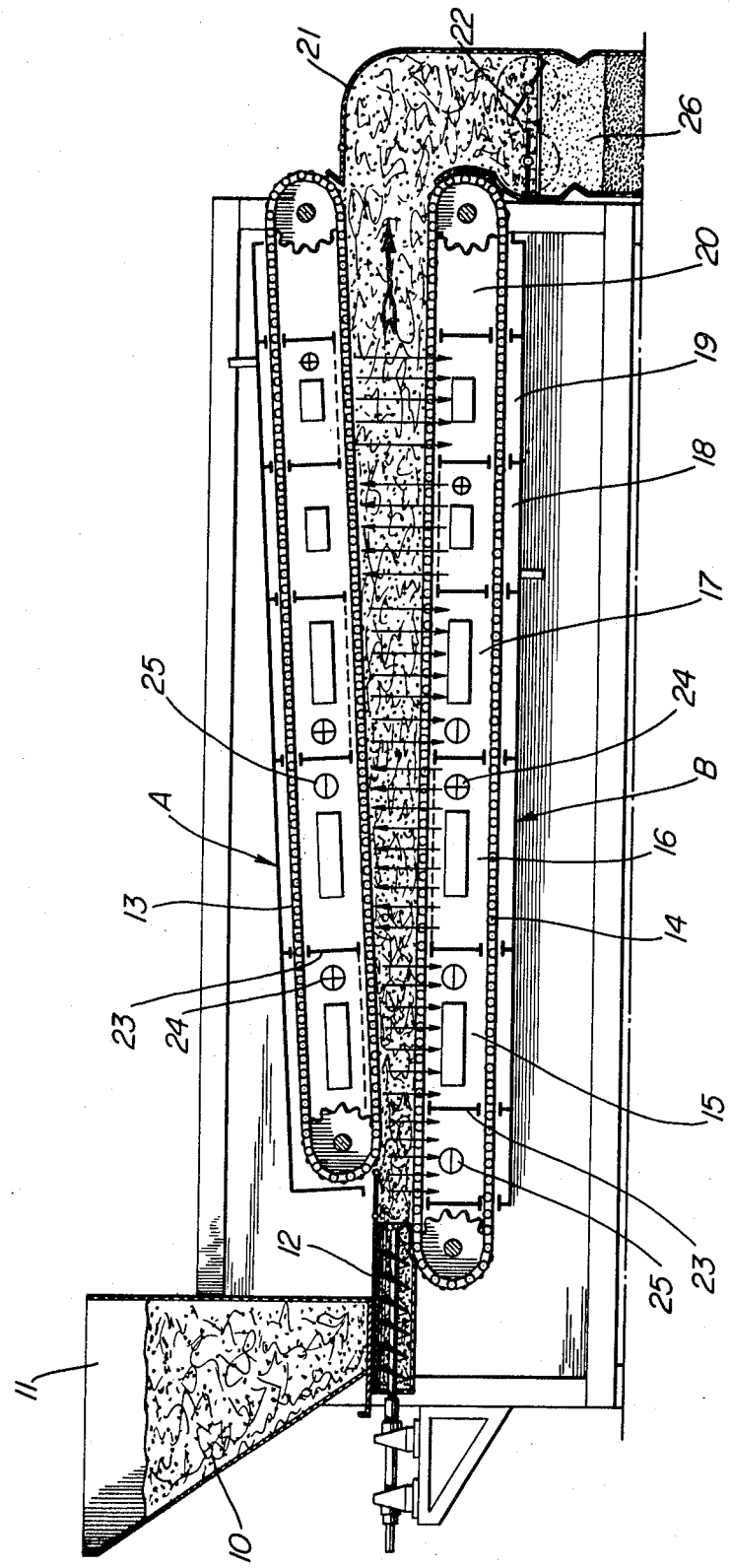

PROCESS FOR EXPANDING POLYSTYRENE

This application is a division of U.S. Ser. No. 542,363, filed Apr. 13, 1966, now U.S. Pat. No. 3,598,769.

Expanded or blown polystyrene is generally formed by applying steam to granules of polystyrene containing a blowing agent. Such granules are known and their constitution has been described in the prior art. The low boiling hydrocarbons are satisfactory blowing agents, e.g., a pentane fraction. The blowing agent is vaporized by the effect of the heat and increases the volume of the granules so that they become expanded and cellular beads of polystyrene. To form articles from the expanded beads the gathered beads may be subjected to pressure and to heat enough to shape and agglomerate them into the form desired, for instance by placing the beads of polystyrene into a mold, applying heat of softening degree, and pressing with a movable piston.

It is economically desirable especially in making thermal insulation, to use a material of less density even though its coefficients of thermal conductivity are greater, as one obtains the same insulating power with less material. For example, if the insulation is formed of a product having a specific mass equal to 12 kg/m$^3$ and if it is desired to have a heat loss $g$ per surface unit per time unit corresponding to a thermal resistance of 1 Kcal/m$^2$.h. $°$ C., the weight of the insulation would be 420 g. To provide the same thermal resistance with a product having a specific mass equal to 8 kg/m$^3$, the weight of the insulation would be 320 g. of about 23 percent less than the weight of the insulation in the first case. For the same thermal resistance with a product having a specific mass equal to 6 kg/m$^3$, the weight of the insulation would be 275 g. or 34 percent less than in the first case.

With the known processes of expanding polystyrene containing a blowing agent — referred to as expansible polystyrene hereafter — mentioned above, it is possible to obtain a product which is light in weight and has good insulating properties. In this connection, it will be noted that there is a predetermined proportionate difference between the apparent density of the beads of polystyrene (that is to say, the density of a given volume occupied by beads and interstices) and the density of the final product which is obtained by compressing the beads to mold or otherwise form them into a desired shape. The value of this proportion is generally from 0.4 to 0.6 and preferably 0.5. By way of illustration, in order to obtain a product having a specific mass of 8 kg/m$^3$, a bulk of beads having an apparent specific mass of about 4 kg/m$^3$ would be used.

One process for obtaining expanded beads of polystyrene having low apparent specific masses for the fabrication of a lightweight product consists of treating granules of expansible polystyrene several times with steam with periods of rest between the applications of steam, and curing after the last one. The intermediate conditioning may be accompanied by passing a moderate flow of room air or warmed air through the mass of beads while the mass is together "in silo." This treatment reduces the apparent specific mass of the beads at each cycle. Starting with a body of granules of expansible polystyrene having an apparent specific mass of about 650 kg/m$^3$ and applying four or five successive operations of steam heating and conditioning, beads having an apparent specific mass of 7 kg/m$^3$ may be produced, but experience has shown that it is difficult to obtain beads having an apparent specific mass less than that.

An object of the present invention is to provide a process for producing beads of polystyrene having an apparent specific mass less than about 7 kg/m$^3$, preferably a density of 0.005 or less. Another object is to provide a process in which beads of polystyrene having an apparent specific mass on the order of 3 to 5 kg/m$^3$ are produced by two or three cycles of heat treatment. Another object is to provide a process and apparatus for continuously treating a moving flow of polystyrene granules to expand them into beads having an apparent specific mass of 5 kg/m$^3$ or less.

These and other objects of the invention are accomplished generally, in accordance with the process of this invention, by treating granules of expansible polystyrene at atmospheric pressure, by successive and alternate treatments with hot air and steam, with intermediate periods of rest between cycles, accompanied or not by insufflation with air at a temperature materially less than the temperature of the heat treatments.

In one manner of practicing the process of the invention, the granules are given their initial expansion by heating them first with the hot air, e.g., at 90° C–100° C. In another manner, an initial expansion is accomplished by applying steam first, before the hot air treatment, and this is particularly desirable. When such steam-expanded grains are used it is advisable to let the expanded grains rest in silo before administering the hot air treatment.

The change of the viscosity of the polystyrene during cooling is not generally sufficiently rapid to avoid some contraction of the beads when the internal pressure of the beads is reduced by the cooling. Therefore, if the cooling is not sufficiently slow to avoid contraction, the beads may be treated by diffusing warm air into the mass of resting beads, which will return them to the maximum volume they attained at the previous expansion.

Examples of the process of this invention for expansion of polystyrene at atmospheric pressure by means of hot air and steam are described below.

EXAMPLE 1

The starting material was granules of polystyrene containing a pentane fraction as blowing agent. They had an apparent specific mass of about 650 Kg/m3. These granules were treated in a container at atmospheric pressure, with steam applied at an initial maximum pressure of 500 g/cm2 to avoid overheating the first granules with which the steam came in contact. The steam was applied for about 5 to 6 minutes after which the granules, now expanded into beads, were roasted for 3 hours at 40° C, in a silo (a cylindrical container having perforated vertical inner walls, which permit air flow, and a conical base to the apex of which air conduits were attached). Warm air was passed through them. At the end of the period of rest the apparent specific mass of the beads was about 13 Kg/m3.

The beads were then reheated with hot air to a temperature of 103° C to 104° C. It is best not to have the air too hot; otherwise, it could cause the beads to stick together. When the beads reached 103° C to 104°C. they were treated with steam for 30 to 40 seconds after which cool air was circulated over them until they were cooled to about 70° C. Alternatively, they could have been allowed to cool naturally or by circulating decreasingly cooler air over them. Then the beads were conditioned in a silo in a flow of air at 20° C to 40° C. for from 1 to 24 hours after which the beads had an apparent specific mass of 5 to 8 Kg/m3.

The treatment described above was then repeated, after which the beads had an apparent specific mass of 3.5 to 5 Kg/m3, the major portion being 4 Kg/m3.

EXAMPLE 2

In another example illustrating the invention, in a first stage, granules of expansible polystyrene having an apparent specific mass of 650 kg/m3 were transformed into beads having an apparent specific mass of 14 Kg/m3 by treating them with steam as in Example 1. In a second stage the beads were reheated with hot air to 103° C to 104° C. for about 65 seconds, after which they were treated with steam for about 35 seconds. Then the beads, in silo, were conditioned by circulating warm air at about 60° C. around them for several hours until the beads had an apparent specific mass of 4 Kg/m3.

EXAMPLE 3

In the apparatus of Example 1 an initial expansion of polystyrene pearls was carried out at 90° C–100° C. by the practices of the prior art with steam in an oven. This preexpansion was followed in one test by 24 hours conditioning (rest) at room temperature (20° C.), before the pearls were subjected to the treatment of the present invention, the cycle of air-steam rest. In another test the conditioning after the preexpansion was for 5 horus at 40° C. In a third test the conditioning was for 3 hours at 50° C. In all tests, it was found to be advisable to condition at temperatures below about 70° C. According to the present invention the preexpansion can be effected by air at temperatures between about 90° C and 130° C., according to the molecular mass of the polystyrene. After the preexpansion and the conditioning the pearls were subjected to at least two cycles of air-steam-rest. In all of these cases the product was lighter than 7 Kg/m3 and in the range of 3 to 5 Kg/m3.

The different cycles of treatment of the granules and beads in accordance with the invention may be applied discontinuously, the granules or beads remaining in one place for treatment, or else continuously, the beads being treated by passing through apparatus for heating them with air followed by a treatment with steam. The continuous process has the advantage of providing more control and regularity of the reheating conditions and of avoiding the heat loss involved in heating and cooling metal members of apparatus or containers in contact with the granules. When the treatment with air and then steam of this invention is applied as a continuous process, with apparatus subsequently described for example, the desired results of the process are accomplished in two cycles (first and second paragraphs of Example 1) instead of three.

Apparatus for applying treatments in accordance with this invention in a continuous process is illustrated in the accompanying schematic drawing. It is to be expressly understood, however, that the drawing is for the purpose of illustration only and is not intended as a definition of the limits of the invention, reference for this latter purpose being had primarily to the appended claims.

Referring to the drawing, granules 10 of expansible polystyrene, which have been partially expanded by a preliminary treatment — with steam for example — and conditioned as described above, are conducted from a hopper 11 by a screw conveyor 12 into a channel formed by a pair of spaced apart chain link conveyor belts 13–14 which carry the granules to the right. The distance between the conveyor belts 13–14 increases from the point at which the granules 10 are fed between the belts by the screw conveyor 12 and the point at the right end of the apparatus at which the granules leave the belts.

The conveyor belts 13 and 14 are each enclosed by housings A and B, respectively, which open toward each other. The two housings are divided by transverse partitions 23 which define compartments 15 to 20. Each compartment has inlets 24 and outlets 25 for the passage of hot air, cool air for conditioning or rest, or steam from appropriate sources. The gas passes through the granules 10 between the belts 13 and 14 and into the opposite portion of the compartment from which it is conducted out of the compartment. The flow of air or steam in successive compartments is respectively in the opposite direction, as indicated by the arrows. The compartments 15, 16, and 17 form a zone in which the granules are insufflated with hot air 15, cooled 16, steamed 17, cooled 18, insufflated with hot air 19 and with steam 20. After compartment 20 the cooling of the granules begins and conditioning is completed in storage silos of which 26 is a diagrammatic suggestion. The conveyor belts 13–14 deliver the granules into a conduit 21 in which the granules pass through a pair of rotary agitators 22, in their path out of the apparatus.

Among the advantage of the new process are that the product is lighter, uses less material, and is equally or more efficient as insulation. Another advantage is that there is a substantial reduction in the cost of the process, stemming somewhat from a reduced use of steam. Other advantages arise from the continuous method and the apparatus which controls it. A further advantage is an improved regularity in the use of each step of the process imparted by the continuous process, and the elimination of the silos and the thermal inertia of the silos used in the batch method. The continuous method usually requires only two cycles whereas the batch method often requires three.

Thanks in particular to the relation between the density of the beads expanded in accordance with the invention and the density of the final product, the products obtained have excellent cohesion and good mechanical properties, such as elasticity and resistance to compression, bending and stamping, despite their low density. The quantity of material required to provide a particular degree of thermal insulation is less with the polystyrene beads expanded in accordance with this invention than with the polystyrene expanded by previously used processes, which is an economic advantage.

The beads, as expanded by the process of this invention and before the formation of articles therefrom, may be provided with a density of 3 to 5 kg/m³ which is novel and has never previously been attained so far as we know. The expanded polystyrene beads have improved efficiency in their many useful applications, for instance as thermal or sound insulation and as a packing material.

The beads of expanded polystyrene make superior compressed industrial products, such as blocks, slabs and shaped pieces, with varying density resulting from molding, extrusion or continuous agglomeration at different pressures and temperatures.

When compressed to a density circa 10 kg/m$^3$ they have superior properties of strength, uniformity, and appearance, and are useful for many industrial applications requiring low heat transmission.

As many apparently widely different embodiments of the present invention may be made without departing from the spirit and scope thereof, it is to be understood that the invention is not limited to the specific embodiments.

What is claimed is:

1. Apparatus for the expansion of discrete particles containing an expansion agent comprising upper and lower foraminous belt conveyors having inner courses which diverge downstream, housing means for the conveyors including a plurality of transverse baffles establishing compartments through which the conveyors pass, means to drive the conveyors, means to supply such particles to the conveyors upstream, means to discharge the conveyors downstream, a sequence of means to insufflate the conveyors and their charge with hot air and steam in sequence as they pass through the compartments with at least two cycles of hot air and steam in alternation, and means to cool and rest the particles between heating steps of the cycles.

2. Apparatus for the expansion of discrete particles of expansible thermoplastic resin comprising upper and lower foraminous conveyor belts having inner courses which are driven and diverge downstream, housing means covering the upper belt, housing means covering the lower belt, baffles extending across the direction of motion of the belts and dividing the housing means into a sequence of upper and lower, aligned chambers through which the inner courses of the belts pass at progressively increasing distances one from the other, means to deliver particles of thermally expansible resin between the belts at an upstream location, means to pass a hot gas through one said chamber and through the portion of the belts and the resin particles therein in one direction at a temperature sufficient to expand the particles but below that which would weld them together, means in a chamber downstream of said chamber to pass a cooling gas through the said particles in the opposite direction, means in a chamber yet further downstream to pass a hot gas of different type through the said particles at a temperature capable of further expanding them but below welding temperature, and means to cool the expanded particles in a chamber yet further downstream.

3. Apparatus according to claim 2, including agitator means to receive the expanded granules from the belts and to deliver them to cooling and resting means.

4. Apparatus according to claim 2 including means to supply succeeding upstream chambers with gas for expansion, gas for cooling, and a different gas for expansion, and successive downstream chambers with one gas for expansion and a different gas for expansion respectively.

5. Apparatus according to claim 4 in which the expansion chambers are succeeded by means to rest and cool the expanded granules.

6. Apparatus for the expansion of thermoplastic resins in discrete particles comprising a series of upper and lower chambers arranged in opposed pairs, a pair of diverging, oppositely disposed, foraminous belts passing between the pairs, means to flow gases through successive pairs of chambers in opposite directions, means to flow a hot gas from the group steam and air through a pair of chambers and the belts in an upstream location, means to flow cooling gas through a pair of chambers and the belts in a location downstream thereof, means in a pair of chambers yet further downstream to flow different hot gases from the said group through the said belts, and means to supply expansible discrete granules to the upstream part of the belts.

7. Apparatus according to claim 6 in which the successive chambers of different treatment are succeeded by means to store the treated granules.

* * * * *

UNITED STATES PATENT OFFICE
CERTIFICATE OF CORRECTION

Patent No. 3,738,020　　　　　　　Dated June 12, 1973

Inventor(s) Daniel Hanton

It is certified that error appears in the above-identified patent and that said Letters Patent are hereby corrected as shown below:

Col. 1, Line 26, "g" should be --q--;

Col. 1, Line 31, "of" (2nd occurrence) should be --or--;

Col. 2, Line 56, "roasted" should be --rested--.

Signed and sealed this 2nd day of April 1974.

(SEAL)
Attest:

EDWARD M. FLETCHER, JR.　　　　　　　C. MARSHALL DANN
Attesting Officer　　　　　　　　　　Commissioner of Patents